Oct. 25, 1960  J. W. COLVIN  2,957,274
PLANT STARTING DEVICE
Filed Feb. 1, 1957  2 Sheets-Sheet 1
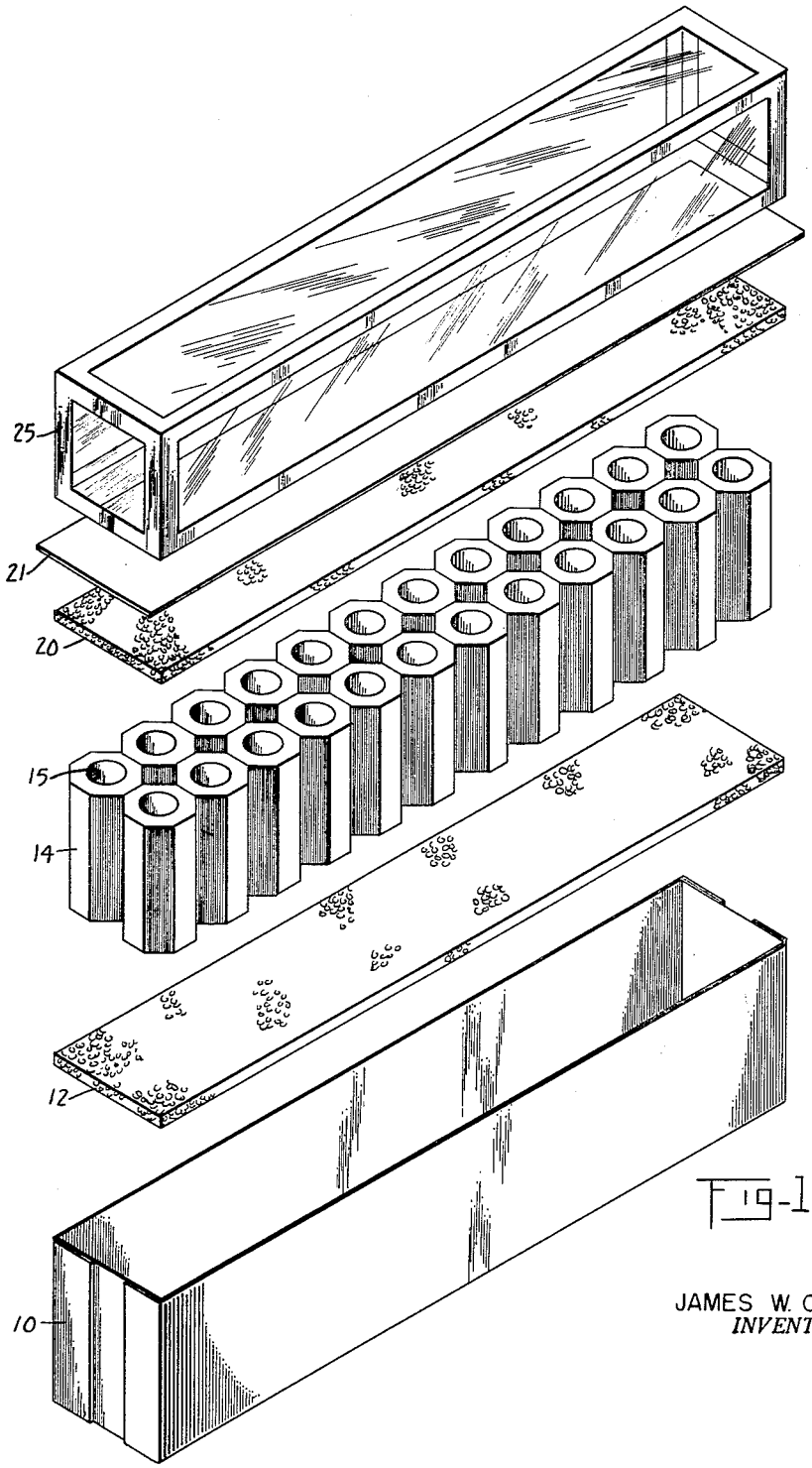
JAMES W. COLVIN
*INVENTOR.*

Oct. 25, 1960 J. W. COLVIN 2,957,274
PLANT STARTING DEVICE
Filed Feb. 1, 1957 2 Sheets-Sheet 2
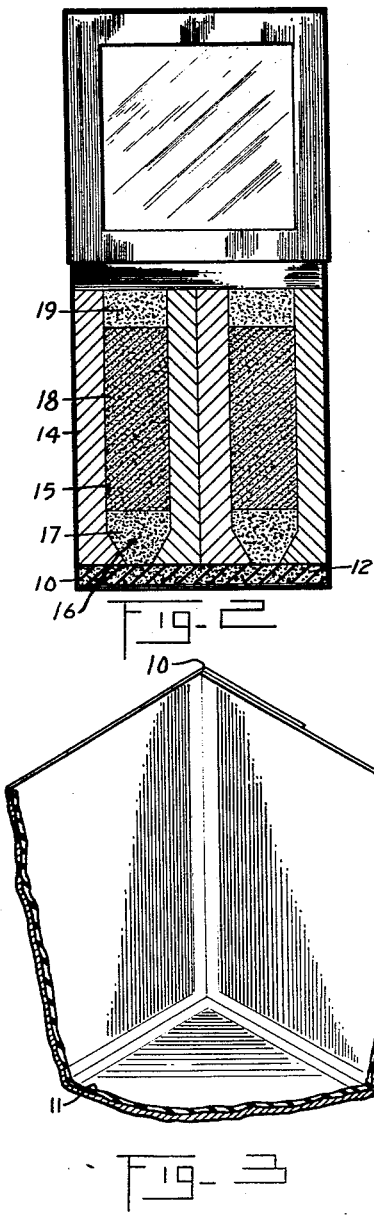
JAMES W. COLVIN
*INVENTOR.*

United States Patent Office 2,957,274
Patented Oct. 25, 1960

2,957,274

PLANT STARTING DEVICE

James W. Colvin, 493 Burnham Road, Williamsburg, Va.

Filed Feb. 1, 1957, Ser. No. 637,700

7 Claims. (Cl. 47—37)

This invention relates to plant starting devices and more particularly to a starting box or miniature greenhouse for the indoor starting of plants from seed for the later transplanting of such plants to outdoor locations.

It is among the objects of the invention to provide plant starting apparatus in the form of a water-proof box containing preseeded transplanting pots which are sealed in the box in dried condition so that the seed will not germinate until the seal is broken and germinating moisture supplied; which includes a lid or cover of transparent material which fully receives the box before the moisture seal is broken but which is adapted to be disposed with its open side adjacent the open side of the box and to be sealed to the box after the moisture seal has been broken to constitute with the water-proof box a miniature greenhouse for the germination and propagation of the plants; which includes transplanting pots formed of a material which will remain in shape for a period sufficient for the growth of the plants to transplanting size but will disintegrate in the soil after being transplanted and which contain sufficient plant food or fertilizer to nourish the plants well past the transplanting stage; which utilizes a box of long narrow shape that can be conveniently placed on the ordinary window stool or ledge and will require no other support; which will normally carry the plants from seed to transplanting size with a single application of water; and which is neat and attractive in appearance, economical to manufacture and effective in operation.

Other objects and advantages will become apparent from a consideration of the following description and the appended claims in conjunction with the accompanying drawings wherein:

Fig. 1 is an exploded perspective view of a plant starting apparatus or miniature greenhouse illustrative of the invention;

Fig. 2 is a transverse cross sectional view on an enlarged scale of the miniature greenhouse shown in Fig. 1, and Fig. 3 is a fragmentary perspective view of a box constituting a portion of the apparatus showing the application of a water-proof coating or lining to the interior of the box.

With continued reference to the drawings, the device comprises an elongated rectangular box 10, formed of a heavy paper or light cardboard material and having on its inner surface a waterproof coating or lining 11 formed of a suitable plastic, such as wax, mastic or a synthetic resin or rubber. It is contemplated that in a commercial application the box will have a width and height of approximately two inches and a length of approximately twelve inches. A flat pad 12 of a suitable absorbent material, such as expanded cellulose, is placed in the bottom of the box and a plurality of transplanting pots 14 is placed in the box on the pad 12. The pots 14 are preferably formed of a fiberous material, such as a mixture of paper pulp and granulated peat moss, to which carefully measured plant food or fertilizer material and binder are added. If found necessary or desirable a coating of moisture resistant or moisture impervious material may be applied to the exterior surfaces of the pots to assist in delaying deterioration of the pots until after they have been removed from the box and planted in the outside soil.

In the arrangement illustrated the pots are of octagonal shape and have a diameter of approximately one inch so that twenty-four of them can be placed in the two inch by twelve inch box. The pots have a length slightly less than two inches and each pot has a coaxial bore 15 which is restricted at the bottom end of the pot, as indicated at 16 in Fig. 2.

A body 17 of granular material, such as coarse sand, is disposed in the lower end of the bore 15 adjacent the restriction 16 and a core 18 of plant starting material, such as mixture of humus and sand, is disposed in the bore above the body 17 and extends to near the top end of the bore. When the pots are seeded a small number of seed of a selected plant variety are placed on the upper end of the core 18 and a wad 19 of granular absorbent material, such as peat moss, is disposed in the upper end of the bore on the upper end of the core 18 and the plant seed.

The pots will preferably be filled and seeded while outside of the box and, in the packing process, the box will be filled with completed pots, transverse spacers, not illustrated, being inserted if desired. A rectangular pad 20 is then placed over the upper ends of the pots. This pad may be formed of porous material but is preferably a rectangular piece of medium weight cardboard having a picture of the plant variety or varieties on its upper side and instructions for starting and transplanting the plants on its lower side.

After the pad 20 is placed over the upper ends of the pots the material is thoroughly dried, the desiccation being carried to a point at which the seed will not germinate until supplied with moisture but terminated short of the point at which the fertility of the seed might be impaired. The material in the box is also preferably sterilized, by irradiation or otherwise, to destroy any fungus or yeast growth or spores that might contaminate the material. After the material in the box has been suitably dried, a sealing sheet 21 of a thin, transparent, impervious material, is placed over the open, top side of the box and its edges are hermetically sealed to the upper portions of the sides and ends of the box.

The assembly includes a cover 25 formed entirely of transparent material, such as a synthetic resin plastic or a synthetic rubber material, or of suitable sheet material, such as cardboard, with windows of transparent material taking up most of the area of its sides. After the sealing sheet 21 has been sealed in place, the cover 25 is placed over the box 10, the box being substantially included in the cover.

The package is now ready for storage, transportation and marketing and the seed will remain dormant as long as the seal is unbroken.

In order to start the plants, the purchaser removes the cover 25, seal 21 and upper pad 20 from the box and pours into the box a measured quantity of water, as directed on the back of the filler sheet or pad 20. The cover is then replaced on the box with the edge of the cover surrounding the open side thereof slightly overlapping the edge of the box surrounding the open side of the box. The overlapping edges of the box and cover are then sealed together with a strip of tape of moisture proof material coated with a pressure adhesive. If the box is now placed in a location having favorable conditions of light and warmth, as on an inside window ledge, the seed will germinate and the plants will grow. When the plants reach the top of the cover, the cover should be removed and discarded and thereafter water should be supplied at regular intervals until climatic conditions permit transplanting.

In transplanting, the box 10 is torn apart and the pots 14 removed therefrom. The pots with the plants growing in them are planted in the soil so that the roots of the plants are not disturbed. Enough fertilizer will remain in the pots to give the plants a good growing start and additional fertilizer may be added to the soil into which the plants are transplanted. Protection of the young plants against destructive garden pests, such as cut worms, slugs and earwigs, may be provided by coating the upper ends of the pots with an insecticidal or insect repellent material or by providing a paper cylinder around each pot and slipping these cylinders up to surround the lower portions of the plants when the pots are placed in the ground.

The present embodiment is for purposes of illustration only and is not to be taken as limiting or restricting the invention, the scope of which is to be measured entirely by the scope of the appended claims and any changes or modifications which fall within the scope of the claims are intended to be included in this disclosure.

I claim:

1. A plant starting assembly comprising a moisture impervious container of elongated rectangular shape having one side open, a plurality of hollow pots in said container having open ends substantially in the plane of the open side of said container, a core of plant starting material and one or more seed in each of said pots, said pots and said plant starting material being sufficiently dry to inhibit seed germination and means hermetically sealing said open side of the container to maintain said pots and said plant starting material in dry condition.

2. A plant starting assembly comprising a moisture impervious container of elongated rectangular shape having one side open, a plurality of hollow transplanting pots disposed in said container and having open ends adjacent the plane of the open side of said container, a core of plant starting material and one or more seed in each pot said pots and said plant starting material being in a substantially dry condition to inhibit the germination of seed in said pots, means hermetically sealing said open side of the container to maintain said pots and said plant starting material in said substantially dry condition and a moisture impervious cover formed at least in part of transparent material receiving said container and having a wall thereof overlying and in protective association with said means hermetically sealing the open side of said container.

3. A plant starting assembly comprising an elongated moisture impervious container of elongated rectangular shape having one side open, a plurality of transplanting pots disposed in said container and arranged with open ends substantially in the plane of the open side of said container, a core of desiccated plant food material in each transplanting pot, one or more seed planted in the plant food material in each pot, a diaphragm of moisture impervious material overlying the open side of said container and sealed to the edge of said container surrounding said open side to maintain said transplanting pots and said plant food in a desiccated condition until said sealing diaphragm is removed, and a cover of moisture impervious, transparent material receiving said container and having a wall thereof overlying and protecting said sealing diaphragm.

4. A plant starting assembly comprising an elongated moisture impervious container of rectangular shape having one side open, a plurality of transplanting pots disposed in said container and having open ends in a plane adjacent the plane of the open side of said container, a core of plant food material in each transplanting pot, one or more seed in each transplanting pot near the open end of the latter, a cover of moisture impervious construction, formed at least in part of transparent material, said cover being of substantially the same size and shape as said container and having an open side said cover receiving said container in the open side thereof with the open side of said container adjacent the open side of said cover, a quantity of water in said container, and means sealing said cover to said container to provide within said container and said cover a moisture retaining space completely isolated from the atmosphere.

5. A plant starting assembly having a dormant condition and an active condition and comprising an elongated, moisture impervious container having an open top side, a plurality of hollow transplanting pots in and substantially filling said container, each of said pots being of a size to support an individual plant until the plant reaches a size suitable for transplanting and having an open end at the open side of said container, a body of plant starting material and one or more seed in each transplanting pot, means hermetically sealing the open side of said container when said assembly is in said dormant condition, a moisture impervious cover of substantially the same size and shape as said container and having an open bottom side, said cover being formed at least in part of transparent material and substantially receiving said container when said assembly is in said dormant condition, said means sealing the open side of said container being removable and said cover being positionable with its edges adjacent its open side slightly overlapping the edges of the container adjacent the open side of the container, and means for sealing said cover to said container when said cover and container are in overlapping positions to provide a sealed space within said container and said cover and a plant growing space above said container having a height substantially equal to the depth of said cover.

6. A miniature green house having a dormant and an active condition and comprising an elongated, narrow container of rectangular shape adapted to sit on a window ledge, said container being moisture impervious and having one open side, a plurality of hollow transplanting pots substantially filling said container and each having an open end adjacent the open side of said container, a body of dry plant starting material and one or more seed in each transplanting pot, and means hermetically sealing the open side of said container when said green house is in its dormant condition, and a moisture impervious transparent cover of substantially the same shape and size as said container and having an open side, said cover and said container being arranged in slightly overlapping relationship at the open sides thereof and said cover being sealed around the edges of its open side to said container in replacement of the means hermetically sealing the open side of said container when said green house is in its active condition, whereby the space in which the seed are disposed is sealed against the outside atmosphere in both the dormant and the active conditions of said green house.

7. A miniature green house having a dormant and an active condition and comprising an elongated narrow container of rectangular shape adapted to be placed on a window ledge, said container being moisture impervious and having one open side, a plurality of transplanting pots of a size to support individual plants to transplanting size arranged in and substantially filling said container, a body of dry plant starting material and one or more seed in each pot, and a sealing sheet closing the open side of said container and covering the open ends of said transplanting pots to maintain the contents of said container in a dry condition while said green house is in said dormant condition, a transparent moisture impervious cover of substantially the same size and shape as said container receiving said container and having an open side, said cover in fully overlapping relationship and having a closed side thereof overlying said sealing sheet when said green house is in said dormant condition, said sealing sheet being removed and said cover being disposed in slightly overlapping relationship to said container and sealed around its open side to said container around the open side of the latter to provide a sealed chamber within said container and said cover, and a body of water being disposed in said container in the active condition of said green house.

References Cited in the file of this patent

UNITED STATES PATENTS

| | | |
|---|---|---|
| 837,977 | Thornton | Dec. 11, 1906 |
| 1,921,027 | Gilbert | Aug. 8, 1933 |
| 1,923,677 | Lovett | Aug. 22, 1933 |
| 1,998,238 | Howeth | Apr. 16, 1935 |
| 2,022,548 | Otwell | Nov. 26, 1935 |
| 2,039,442 | Mulford | May 5, 1936 |
| 2,106,487 | Lumry | Jan. 25, 1938 |
| 2,148,048 | Gray | Feb. 21, 1939 |
| 2,238,818 | Mulford | Apr. 15, 1941 |
| 2,713,232 | Peterson | July 19, 1955 |
| 2,739,422 | Perkins | Mar. 27, 1956 |

FOREIGN PATENTS

| | | |
|---|---|---|
| 252,213 | Germany | Oct. 17, 1912 |
| 594,305 | Germany | July 3, 1934 |